United States Patent
Choi et al.

(10) Patent No.: US 9,991,810 B2
(45) Date of Patent: Jun. 5, 2018

(54) GATE PRE-POSITIONING FOR FAST TURN-OFF OF SYNCHRONOUS RECTIFIER

(71) Applicant: FAIRCHILD SEMICONDUCTOR CORPORATION, Sunnyvale, CA (US)

(72) Inventors: Hangseok Choi, Bedford, NH (US); Wei-Hsuan Huang, Hsinchu (TW); Cheng-Sung Chen, Hsinchu (TW)

(73) Assignee: FAIRCHILD SEMICONDUCTOR CORPORATION, Phoeniz, AZ (US)

( * ) Notice: Subject to any disclaimer, the term of this patent is extended or adjusted under 35 U.S.C. 154(b) by 0 days. days.

(21) Appl. No.: 15/358,322

(22) Filed: Nov. 22, 2016

(65) Prior Publication Data

US 2017/0244333 A1   Aug. 24, 2017

Related U.S. Application Data

(60) Provisional application No. 62/298,306, filed on Feb. 22, 2016.

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0054* (2013.01); *Y02B 70/1475* (2013.01)

(58) Field of Classification Search
CPC ........... H02M 2001/0054; H02M 1/08; H02M 3/33592; Y02B 70/1475
See application file for complete search history.

(56) References Cited

U.S. PATENT DOCUMENTS

| | | | | |
|---|---|---|---|---|
| 6,127,746 A | * | 10/2000 | Clemente | G01R 19/12 307/131 |
| 6,275,093 B1 | * | 8/2001 | Shekhawat | H03K 17/0828 327/432 |
| 7,514,967 B2 | * | 4/2009 | Higashi | H03K 17/0828 327/108 |
| 7,817,392 B2 | * | 10/2010 | Lee | H03K 17/08128 361/89 |
| 7,999,600 B2 | * | 8/2011 | Havanur | H03K 17/08142 327/377 |
| 8,102,192 B2 | * | 1/2012 | Mourrier | H03K 17/16 327/108 |
| 8,994,349 B2 | | 3/2015 | Martinelli | |
| 9,001,532 B2 | | 4/2015 | Olivik et al. | |
| 9,007,793 B2 | | 4/2015 | Zhao et al. | |
| 9,013,898 B2 | | 4/2015 | Ptacek et al. | |
| 9,024,760 B1 | | 5/2015 | Steiner | |
| 9,054,592 B2 | | 6/2015 | Yao et al. | |
| 9,054,658 B2 | | 6/2015 | Nussbaum et al. | |

(Continued)

Primary Examiner — Fred E Finch, III

(57) ABSTRACT

A synchronous rectifier driver pre-positions a gate of a synchronous rectifier to allow for fast turn-off. The synchronous rectifier driver turns ON the synchronous rectifier by driving the gate at a high level for a period of time that is based on a previous conduction time of the synchronous rectifier. The synchronous rectifier driver thereafter drives the gate at a lower level that is sufficient to keep the synchronous rectifier ON. The synchronous rectifier can be quickly turned OFF by further reducing the level of the drive signal at the gate of the synchronous rectifier.

19 Claims, 11 Drawing Sheets

(56) References Cited

U.S. PATENT DOCUMENTS

| | | |
|---|---|---|
| 9,071,141 B2 | 6/2015 | Dong et al. |
| 9,083,247 B2 | 7/2015 | Choi |
| 9,088,216 B2 * | 7/2015 | Garrity ............... H02M 1/4225 |
| 9,099,928 B2 | 8/2015 | Lu |
| 9,099,929 B2 | 8/2015 | Tseng et al. |
| 9,106,129 B2 | 8/2015 | Yin et al. |
| 9,157,898 B1 | 10/2015 | Steiner |
| 9,214,869 B2 | 12/2015 | Springett et al. |
| 9,219,416 B2 | 12/2015 | Seok |
| 9,236,809 B2 * | 1/2016 | Wang ................ H02M 3/33592 |
| 9,438,228 B2 * | 9/2016 | Peng ................... H03K 17/166 |
| 2009/0116154 A1 * | 5/2009 | Kim .................... H03K 17/168 |
| | | 361/18 |
| 2012/0068683 A1 * | 3/2012 | Liu ........................ H02M 1/08 |
| | | 323/311 |

* cited by examiner

GATE PRE-POSITIONING FOR FAST TURN-OFF OF SYNCHRONOUS RECTIFIER

CROSS-REFERENCE TO RELATED APPLICATION

The present application claims the benefit of U.S. Provisional Application No. 62/298,306, filed on Feb. 22, 2016, which is incorporated herein by reference in its entirety.

BACKGROUND OF THE INVENTION

1. Field of the Invention

The present invention relates generally to electrical circuits, and more particularly but not exclusively to synchronous rectifiers.

2. Description of the Background Art

Rectifier diodes are employed in switching converters, such as flyback converters. Generally speaking, a flyback converter is a buck-boost converter where the output inductor is split to form a transformer. In a flyback converter, a primary-side switch is closed to connect the primary winding of the transformer to an input voltage source. Closing the primary-side switch increases the primary current and magnetic flux, stores energy in the transformer, and induces current on the secondary winding of the transformer. The induced current has a polarity that places a diode rectifier in reverse bias to block charging of an output capacitor. When the primary-side switch is opened, the primary current and magnetic flux drop, and the current on the secondary winding changes polarity to thereby forward bias the diode rectifier and allow charging of the output capacitor to generate a DC output voltage.

Many flyback converters employ diode rectifiers to generate the DC output voltage. The conduction loss of a diode rectifier contributes significantly to the overall power loss, especially in low-voltage, high-current converter applications. The conduction loss of a diode rectifier is given by the product of its forward voltage drop and forward conduction current. By replacing the diode rectifier with a metal-oxide semiconductor field effect transistor (MOSFET) operated as a synchronous rectifier, the equivalent forward voltage drop can be lowered and, consequently, the conduction loss can be reduced. Unlike a diode rectifier, however, the conduction of the synchronous rectifier has to be actively controlled by an additional circuit, such as a synchronous rectifier driver.

SUMMARY

In one embodiment, a synchronous rectifier driver pre-positions a gate of a synchronous rectifier to allow for fast turn-off. The synchronous rectifier driver turns ON the synchronous rectifier by driving the gate at a high level for a period of time that is based on a previous conduction time of the synchronous rectifier. The synchronous rectifier driver thereafter drives the gate at a lower level that is sufficient to keep the synchronous rectifier ON. The synchronous rectifier can be quickly turned OFF by further reducing the level of the drive signal at the gate of the synchronous rectifier.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
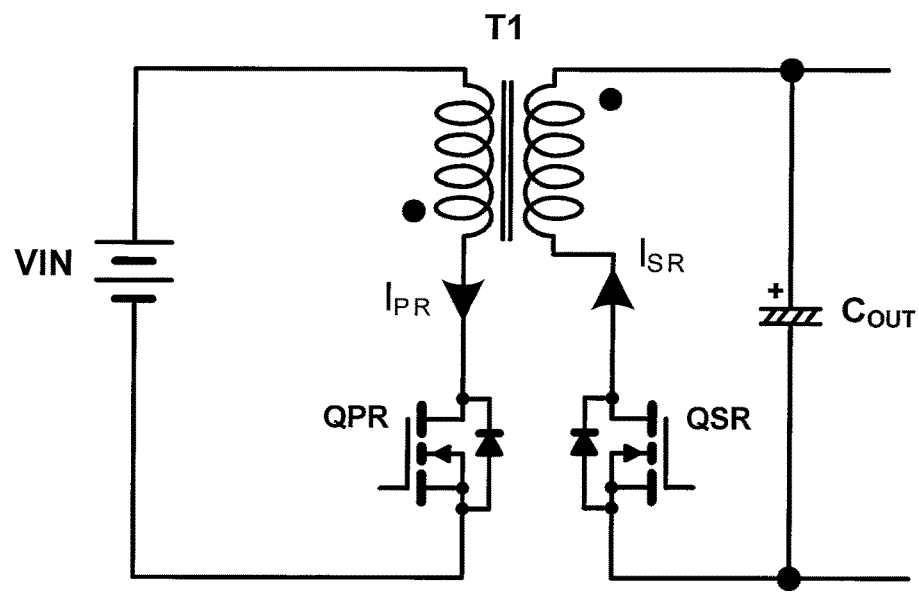
FIG. 1 shows a schematic diagram of a flyback converter that may take advantage of embodiments of the present invention.

FIG. 1 shows a schematic diagram of a flyback converter that may take advantage of embodiments of the present invention. In the example of FIG. 1, the flyback converter includes a primary-side switch QPR, a synchronous rectifier QSR, a transformer T1, and an output capacitor COUT. In one embodiment, the primary-side switch QPR and the synchronous rectifier QSR are MOSFETs.

When the primary-side switch QPR is turned ON, the primary winding of the transformer T1 is connected to the input voltage source VIN, resulting in a primary-side current IPR flowing through the primary winding. When the primary-side switch QPR is turned OFF, the energy stored in the primary winding of the transformer T1 is released to the secondary winding of the transformer T1. This turns ON the body diode of the synchronous rectifier QSR, resulting in a synchronous rectifier current ISR flowing through the secondary winding of the transformer T1 to charge the output capacitor COUT. When onset of body diode conduction is detected, the synchronous rectifier QSR is turned ON, thereby minimizing the forward voltage drop across the synchronous rectifier QSR by providing a low impedance current path in parallel with its body diode. To prevent current inversion, the synchronous rectifier QSR is turned OFF before the synchronous rectifier current ISR reaches zero.

Figure 2:
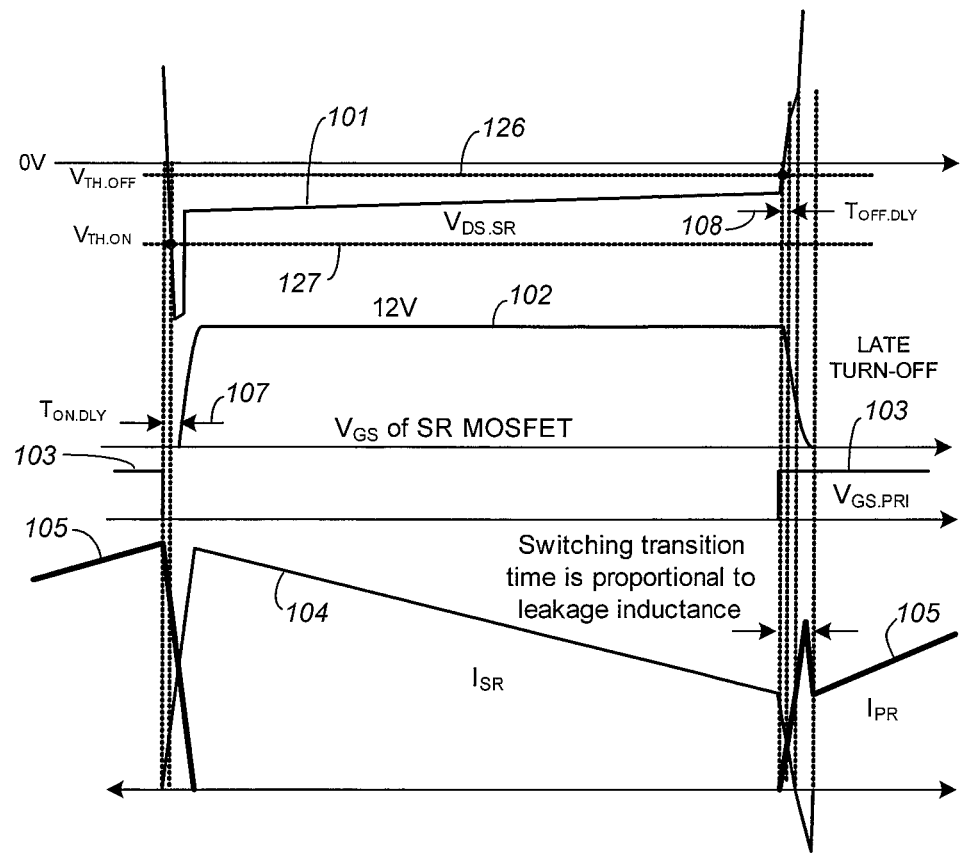
FIG. 2 shows waveforms of signals of the flyback converter of FIG. 1 when the synchronous rectifier is driven by a conventional synchronous rectifier driver.

FIG. 2 shows waveforms of signals of the flyback converter of FIG. 1 when the synchronous rectifier QSR is driven by a conventional synchronous rectifier driver ("SR driver"). FIG. 2 shows waveforms of the drain-to-source voltage (see 101) of the synchronous rectifier QSR, the gate-to-source voltage VGS (i.e., gate drive signal) of the synchronous rectifier QSR (see 102), the gate-to-source voltage VGS of the primary-side switch QPR (see 103), the synchronous rectifier current ISR (see 104), and the primary-side current IPR (see 105). FIG. 2 also shows the turn-off threshold VTH.OFF and the turn-on threshold VTH.ON for controlling conduction of the synchronous rectifier QSR. The synchronous rectifier QSR is turned ON when its drain-to-source voltage VGS drops below the turn-on threshold VTH.ON, which is caused by conduction of its body diode. The synchronous rectifier QSR turns ON after a turn-on delay time TON.DLY (see 107) that is relative to the primary-side switch QPR being turned OFF. As the synchronous rectifier current ISR (i.e., drain-to-source current of the synchronous rectifier QSR) reaches zero, the drain-to-source voltage VDS of the synchronous rectifier QSR rises above the turn-off threshold VTH.OFF and the synchronous rectifier QSR is turned OFF. The synchronous rectifier QSR turns OFF after a turn-off delay time TOFF.DLY (see 108) that is relative to the primary-side switch QPR being turned ON. The turn-off of the synchronous rectifier QSR is late in the example of FIG. 2. After the synchronous rectifier QSR is turned OFF, the synchronous rectifier current ISR flows through the body diode of the synchronous rectifier QSR, and the body diode of the synchronous rectifier QSR is reverse biased when the synchronous rectifier current ISR reaches zero.

Generally speaking, in continuous conduction mode (CCM) operation of the flyback converter, the synchronous rectifier current ISR drops in a very short time (e.g., 50-100 ns) after the primary side switch QPR is turned ON. To properly operate the synchronous rectifier QSR without any severe cross-conduction between the primary-side switch QPR and the synchronous rectifier QSR, the synchronous rectifier gate driver needs to be able to turn OFF the synchronous rectifier QSR within a very short time. However, the speed of a gate driver is related to the physical size of its circuit. What is needed is an improved gate driver that provides fast turn-off of the synchronous rectifier QSR without an increase in chip size relative to conventional gate drivers.

Figure 3:
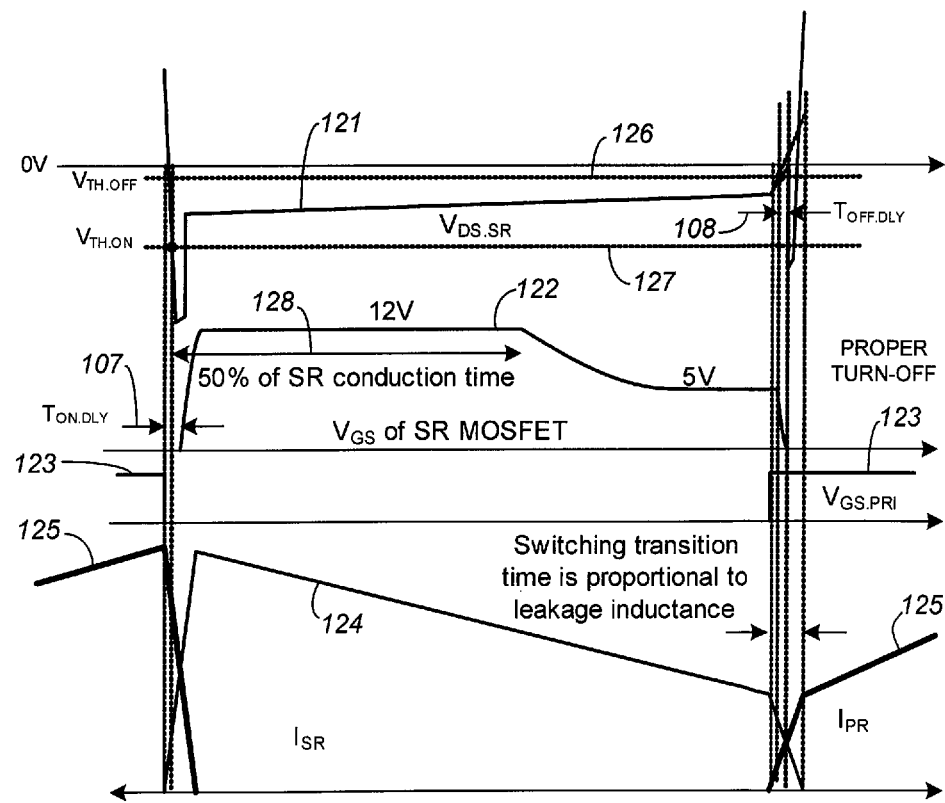
FIG. 3 shows waveforms of signals of the flyback converter of FIG. 1 when the synchronous rectifier is driven by a synchronous rectifier driver with gate pre-positioning in accordance with an embodiment of the present invention.

FIG. 3 shows waveforms of signals of the flyback converter of FIG. 1 when the synchronous rectifier QSR is driven by an SR driver (e.g., see FIG. 6, 200) with gate pre-positioning in accordance with an embodiment of the present invention. FIG. 3 shows waveforms of the drain-to-source voltage (see 121) of the synchronous rectifier QSR, the gate-to-source voltage VGS of the synchronous rectifier QSR (see 122), the gate-to-source voltage VGS of the primary-side switch QPR (see 123), the synchronous rectifier current ISR (see 124), and the primary-side current IPR (see 125). FIG. 3 also shows the turn-off threshold VTH.OFF (see 126), the turn-on threshold VTH.ON (see 127), the turn-off delay time TOFF.DLY (see 108), and the turn-on delay time TON.DLY (see 107).

In the example of FIG. 3, the synchronous rectifier QSR is turned ON by a pre-positioning gate drive signal, i.e., gate-to-source voltage of the synchronous rectifier QSR (see 122), that has a high first level to minimize the drain-to-source ON resistance RDSON of the synchronous rectifier QSR. After 50% of the synchronous rectifier conduction time of the previous switching cycle (see 128), the gate drive signal is slowly reduced to a second level that is slightly higher than the gate turn-on threshold of the synchronous rectifier QSR. The gate drive signal is maintained at the second level until the synchronous rectifier QSR is to be turned OFF. In the example of FIG. 3, this is illustrated by providing a gate-to-source voltage VGS of 12V for a period of time, then reducing the gate-to-source voltage to 5V. The gate-to-source voltage is maintained at 5V until turn-off of the synchronous rectifier. Reducing the gate-to-source voltage to 5V pre-positions the gate for turn-off. Accordingly, when the primary-side switch QPR is turned ON and the synchronous rectifier current ISR reduces abruptly, the synchronous rectifier QSR can be turned OFF in a very short time. The turn-off of the synchronous rectifier QSR is thus proper in the example of FIG. 3.

Figure 4:
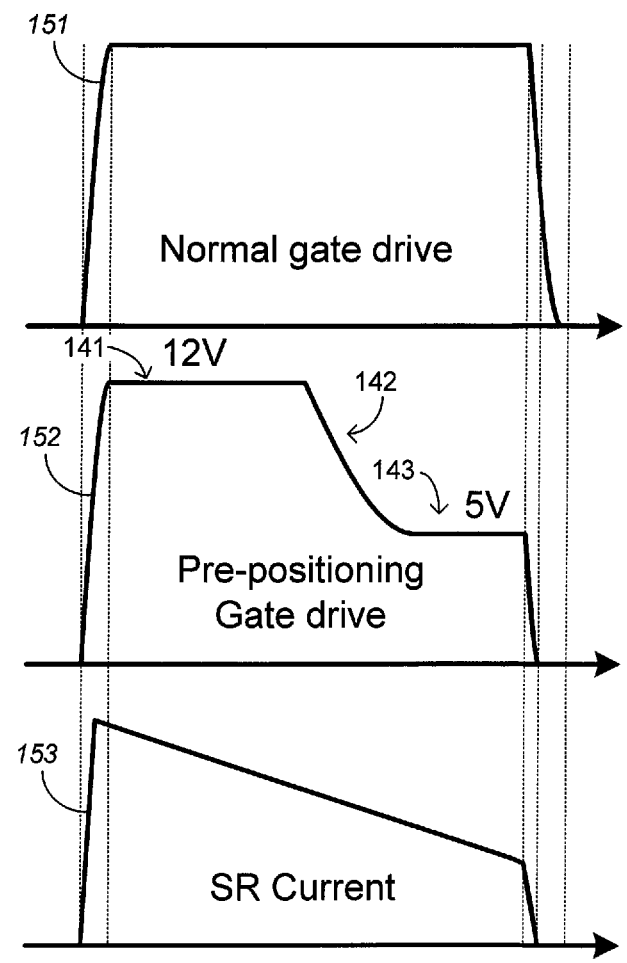
FIG. 4 shows a comparison of waveforms of a pre-positioning gate drive signal and a conventional gate drive-signal.

FIG. 4 shows, from top to bottom, waveforms of a conventional gate drive signal to a synchronous rectifier (see 151), pre-positioning gate drive signal to the synchronous rectifier (see 152), and synchronous rectifier current through the synchronous rectifier (see 153). A conventional SR driver drives the gate of a synchronous rectifier with a gate drive signal that has a relatively constant level from the start to the end of the gate drive signal pulse (see 151), which prevents the SR driver from rapidly turning OFF the synchronous rectifier unless the SR driver has a large chip size to accommodate a gate driver with the requisite current drive capability.

In marked contrast, a pre-positioning SR driver in accordance with an embodiment of the present invention drives the gate of the synchronous rectifier with a gate drive signal (see 152) that changes levels in the same turn ON instance (e.g., the same pulse) to pre-position the gate before the gate is driven low to turn OFF the synchronous rectifier. In the example of FIG. 4, this is accomplished by providing a gate drive signal that has a high first voltage level (see 141; e.g., 12V) for a period of time that is based on the conduction time of the synchronous rectifier (e.g., 50% of the previous synchronous rectifier conduction time), reducing the gate drive signal from the first voltage level to a second voltage level at the end of the period of time (see 142; e.g., reduce from 12V to 5V), and maintaining the gate drive signal at the second voltage level for another period of time (see 143) until the synchronous rectifier is to be turned OFF. Because the second voltage level is lower than the first voltage level but is sufficient to keep the synchronous rectifier ON, the SR driver can turn OFF the synchronous rectifier faster for a given chip size. That is, by pre-positioning the gate with a low level gate drive signal prior to driving the gate even lower to turn OFF the synchronous rectifier, fast turn-off of the synchronous rectifier can be achieved without necessarily increasing the chip size of the SR driver.

Figure 5:
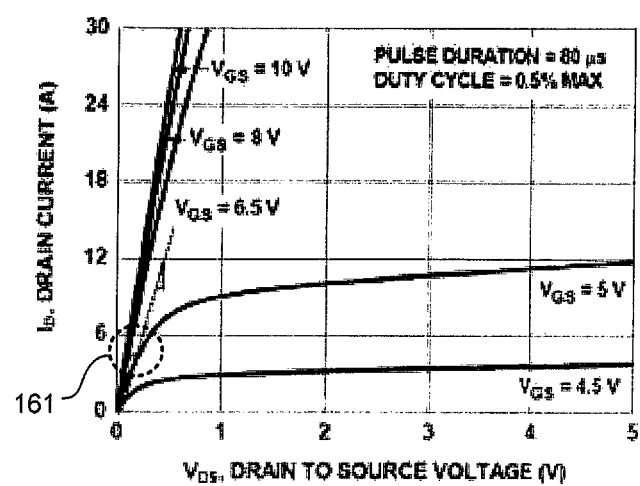
FIG. 5 shows typical ON-region characteristics of a MOSFET.

FIG. 5 shows typical ON-region characteristics of a MOSFET. FIG. 5 shows the MOSFET's drain current versus drain-to-source voltage for various gate-to-source voltages. As shown in the example of FIG. 5, the drain current of the MOSFET is affected by the gate-to-source voltage but, at relatively low drain-to-source voltages (see 161) as is the case in synchronous rectifier applications, the impact of gate pre-positioning on the conduction loss of the MOSFET is relatively small.

Figure 6:
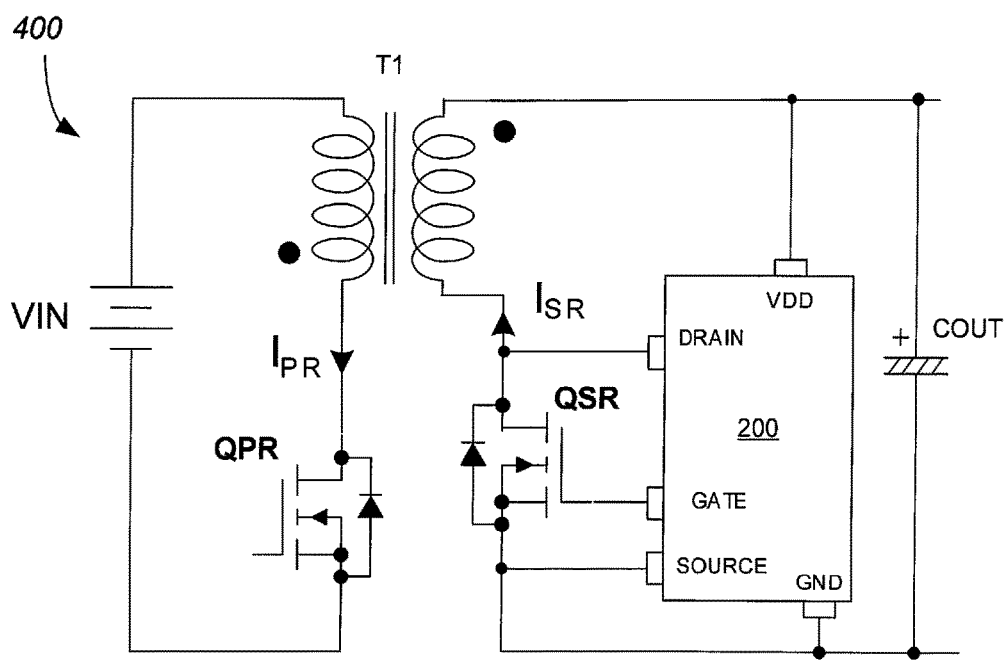
FIG. 6 shows a schematic diagram of a switching converter circuit in accordance with an embodiment of the present invention.

FIG. 6 shows a schematic diagram of a switching converter in accordance with an embodiment of the present invention. In the example of FIG. 6, the switching converter is a flyback converter 400, which is the same as that of FIG.

1 except that the synchronous rectifier QSR is driven by a pre-positioning SR driver 200. In the example of FIG. 6, the SR driver 200 is implemented as an integrated circuit (IC) with a plurality of pins including a DRAIN pin for connecting to the drain of the synchronous rectifier QSR, a SOURCE pin for connecting to the source of the synchronous rectifier QSR, a GND pin for connecting to a ground reference, a GATE pin for connecting to the gate of the synchronous rectifier QSR, and a VDD pin for receiving a supply voltage.

Figure 7:
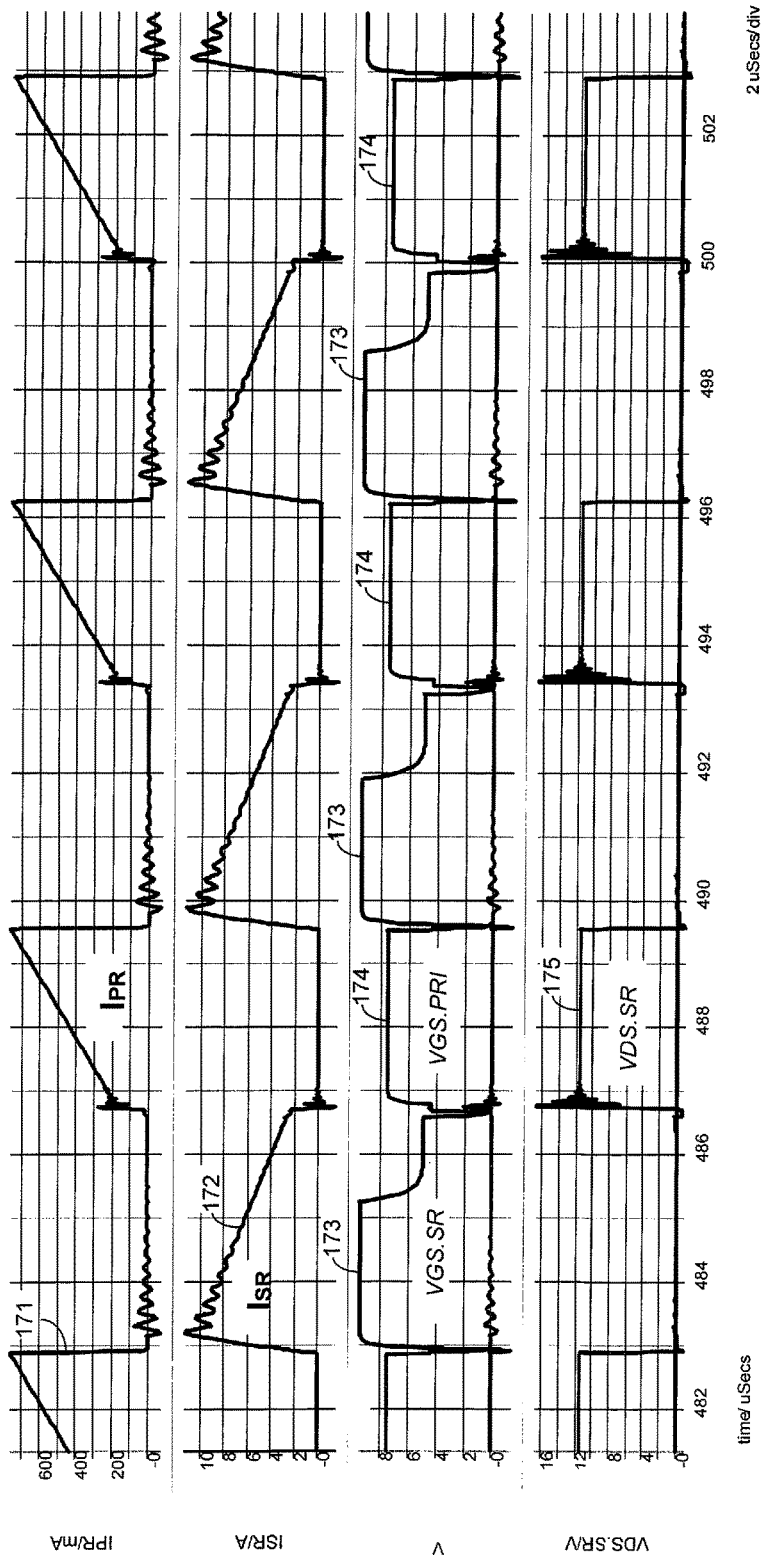
FIG. 7 shows waveforms of signals of the switching converter circuit of FIG. 6 in accordance with an embodiment of the present invention.

FIG. 7 shows waveforms of signals of the flyback converter 400 in accordance with an embodiment of the present invention. FIG. 7 shows the primary-side current IPR through the primary-side switch QPR (see 171), the synchronous rectifier current ISR (see 172), the pre-positioning gate drive signal to the synchronous rectifier QSR (see 173), the gate drive signal to the primary-side switch QPR (see 174), and the drain-to-source voltage of the synchronous rectifier QSR (see 175). In the example of FIG. 7, the pre-positioning gate drive signal is the gate-to-source voltage of the synchronous rectifier QSR. The gate-to-source voltage is pre-positioned from a high level to a low level before the synchronous rectifier QSR is turned OFF. The gate-to-source voltage is made even lower to turn OFF the synchronous rectifier QSR.

Figure 8:
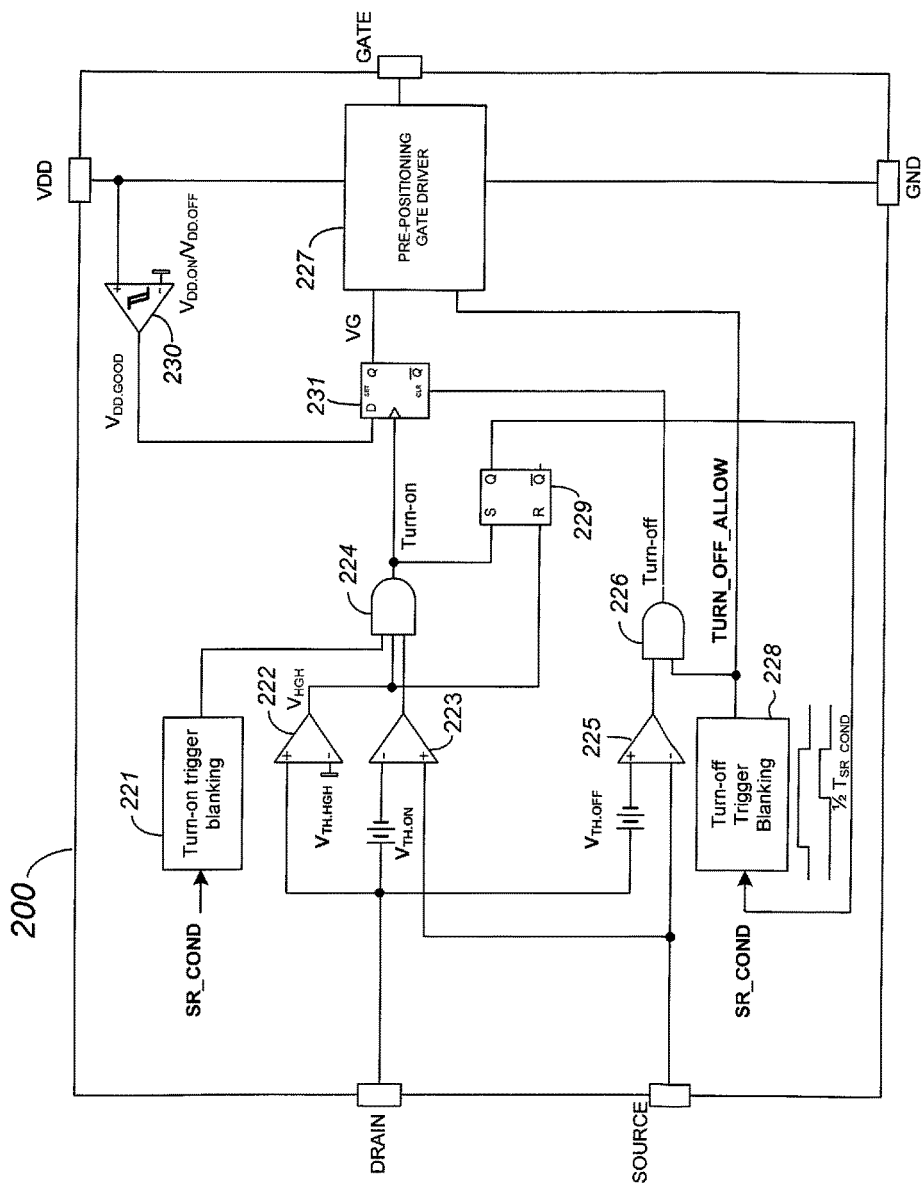
FIG. 8 shows a schematic diagram of a synchronous rectifier driver in accordance with an embodiment of the present invention.

FIG. 8 shows a schematic diagram of the SR driver 200 in accordance with an embodiment of the present invention. In the example of FIG. 8, an AND gate 224 outputs a turn-on trigger signal for initiating turn-on of the synchronous rectifier QSR. The turn-on trigger signal sets a latch 229, which outputs an SR_COND signal that indicates conduction of the synchronous rectifier QSR. A comparator 230 outputs a supply good signal VDD.GOOD, which is input to the D flip-flop 231. The turn-on trigger signal clocks the D flip-flop 231 to assert a gate signal VG when the synchronous rectifier QSR is to be turned ON. The synchronous rectifier QSR thus cannot be turned ON when the supply voltage VDD, as indicated by the supply good signal VDD.GOOD, is not sufficient to sustain operation.

In the example of FIG. 8, the SR_COND signal from the latch 229 triggers a turn-on trigger blanking circuit 221 to output a turn-on blanking signal for preventing turn-on of the synchronous rectifier QSR during a turn-on blanking time (e.g., fixed turn-on blanking time of 1 µs). The drain-to-source voltage of the synchronous rectifier QSR, as detected from the DRAIN and SOURCE pins, is compared to the turn-on threshold VTH.ON by the amplifier 223 to determine when to turn ON the synchronous rectifier QSR, compared to the turn-off threshold VTH.OFF by the comparator 225 to determine when to turn OFF the synchronous rectifier QSR, and compared to the onset threshold VTH.HGH by the amplifier 222 to detect onset of body diode conduction of the synchronous rectifier QSR. An AND gate 226 outputs the turn-off trigger signal to initiate turning OFF the synchronous rectifier QSR.

In the example of FIG. 8, the SR_COND signal from the latch 229 also triggers a turn-off trigger blanking circuit 228 to output a turn-off trigger blanking signal (TURN_OFF_ALLOW), which provides a turn-off blanking time that is adaptively selected to be a percentage (e.g., 50%) of the detected conduction time of the synchronous rectifier QSR in the previous switching cycle. Because the turn-off blanking time is adaptively selected, the SR driver 200 integrated circuit advantageously does not need a dedicated pin for programming the turn-off blanking time. In one embodiment, the turn-off blanking signal is employed as a pre-positioning signal.

In the example of FIG. 8, a pre-positioning gate driver 227 outputs a pre-positioning gate drive signal at the GATE pin. The pre-positioning gate driver 227 receives the gate signal VG from the D flip-flop 231, the supply good signal VDD.GOOD (see FIG. 10, input to D flip-flop 232), and the adaptive turn-off trigger blanking signal (TURN_OFF_ALLOW) from the turn-off trigger blanking circuit 228. The adaptive turn-off trigger blanking signal may be employed by the pre-positioning gate driver 227 to trigger reduction of the level of the gate drive signal at the GATE pin for pre-positioning to a lower level that is just above the gate turn-on threshold of the synchronous rectifier QSR.

Figure 9:
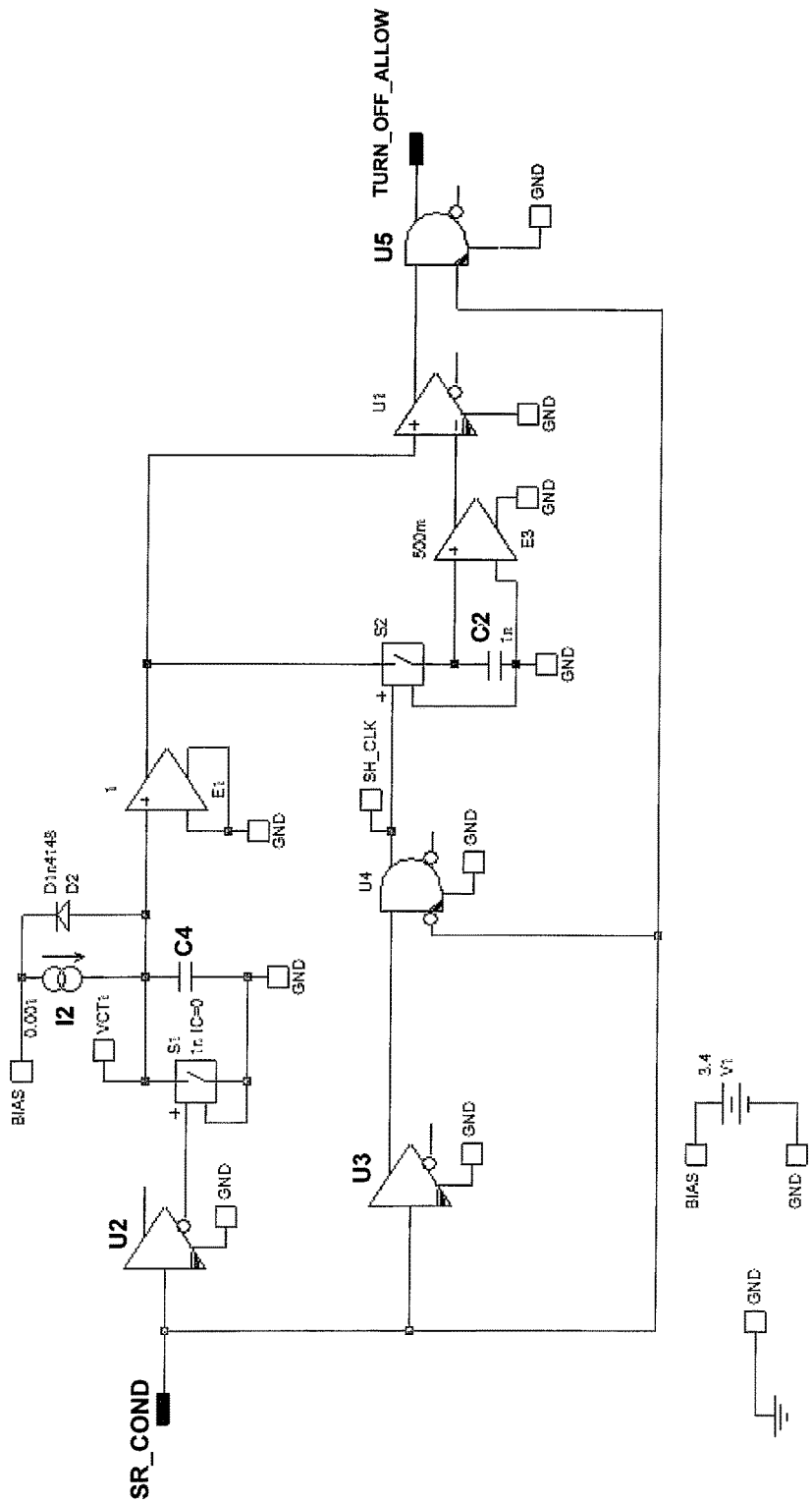
FIG. 9 shows a schematic diagram of a turn-off trigger blanking circuit in accordance with an embodiment of the present invention.

FIG. 9 shows a schematic diagram of the turn-off trigger blanking circuit 228 in accordance with an embodiment of the present invention. In the example of FIG. 9, the SR_COND signal is delayed by a delay circuit U2 (e.g., 30 ns delay) and a delay circuit U3 (e.g., 20 ns delay) to ensure proper sample and hold. In the example of FIG. 9, a timing capacitor C4 is charged by a current source 12 according to the SR_COND signal. The peak voltage of timing capacitor C4 is proportional to the synchronous rectifier conduction time for each switching cycle. The peak value of the timing capacitor C4 voltage is sampled and stored in a capacitor C2. Then, half of the voltage on the capacitor C2 is compared to the voltage on the timing capacitor C4 in the next switching cycle to generate the turn-off trigger blanking signal (TURN_OFF_ALLOW). The turn-off trigger blanking signal rising edge is delayed from the SR_COND signal rising edge by half of the synchronous rectifier conduction time of the previous switching cycle. The turn-off trigger blanking signal is output by a gate U5.

Figure 10:
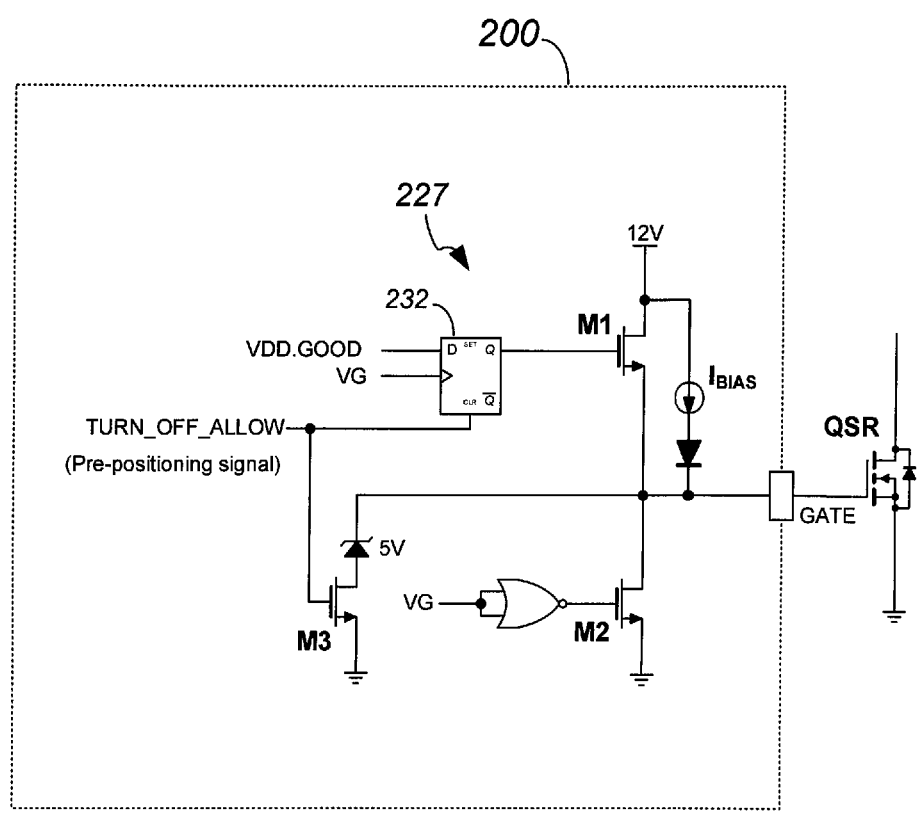
FIG. 10 shows a schematic diagram of a pre-positioning gate driver of a synchronous rectifier driver in accordance with an embodiment of the present invention.

FIG. 10 shows a schematic diagram of the pre-positioning gate driver 227 of the SR driver 200 in accordance with an embodiment of the present invention. FIG. 10 shows the gate of the external synchronous rectifier QSR connected to the GATE pin of the SR driver 200 to receive the gate drive signal output of the pre-positioning gate driver 227. In the example of FIG. 10, the pre-positioning gate driver 227 includes a high-side switch M1 and a low-side switch M2 for turning the synchronous rectifier QSR ON and OFF, respectively. More particularly, the high-side switch M1 is driven for fast turn-on of the synchronous rectifier QSR and the low-side switch M2 is driven for fast turn-off of the synchronous rectifier QSR. A switch M3, which is sized much smaller than the switches M1 and M2 (e.g., ⅕₀ to ¹⁄₁₀₀ of the size of the switches M1 and M2), is for slow pre-positioning.

In the example of FIG. 10, a drain of the switch M3 is connected to the gate of the synchronous rectifier QSR by way of a Zener diode. The drain of the switch M3 is also connected to the drain of the switch M2 and a source of the switch M1. A source of the switch M3 is connected to ground and a gate of the switch M3 receives the pre-positioning signal, which in the example of FIG. 10 is the adaptive turn-off trigger blanking signal TURN_OFF_ALLOW. A gate of the switch M2 is driven by the gate signal VG from the output of the D flip-flop 231 (shown in FIG. 8), and a source of the switch M2 is connected to ground. A bias current IBIAS is generated by a current source that is connected between the drain of the switch M1 and the gate of the synchronous rectifier QSR. The drain of the switch M1 is connected to a supply voltage and a gate of the switch M1 is driven by the D flip-flop 232.

In the example of FIG. 10, driving the switch M3 generates a pre-positioning voltage at the GATE pin to pre-position the gate of the synchronous rectifier QSR. The pre-positioning voltage is just above the gate turn-on threshold of the synchronous rectifier QSR to keep the synchronous rectifier QSR ON. The bias current IBIAS (e.g., 200 μA to 500 μA) maintains the pre-positioning voltage at the GATE pin.

In the example of FIG. 10, the supply good signal VDD.GOOD from the comparator 230 (shown in FIG. 8) is clocked into the D flip-flop 232 by the gate signal VG from the D flip-flop 231 (shown in FIG. 8) to turn ON the high-side switch M1. The complement of the gate signal VG drives the gate of the low-side switch M2. The turn-off trigger blanking signal (TURN_OFF_ALLOW; see FIG. 8, 228) is employed as a pre-positioning signal to turn ON the switch M3 and reduce the pre-positioning gate drive signal to the synchronous rectifier QSR after 50% of the conduction time of synchronous rectifier QSR in the previous switching cycle.

Figure 11:
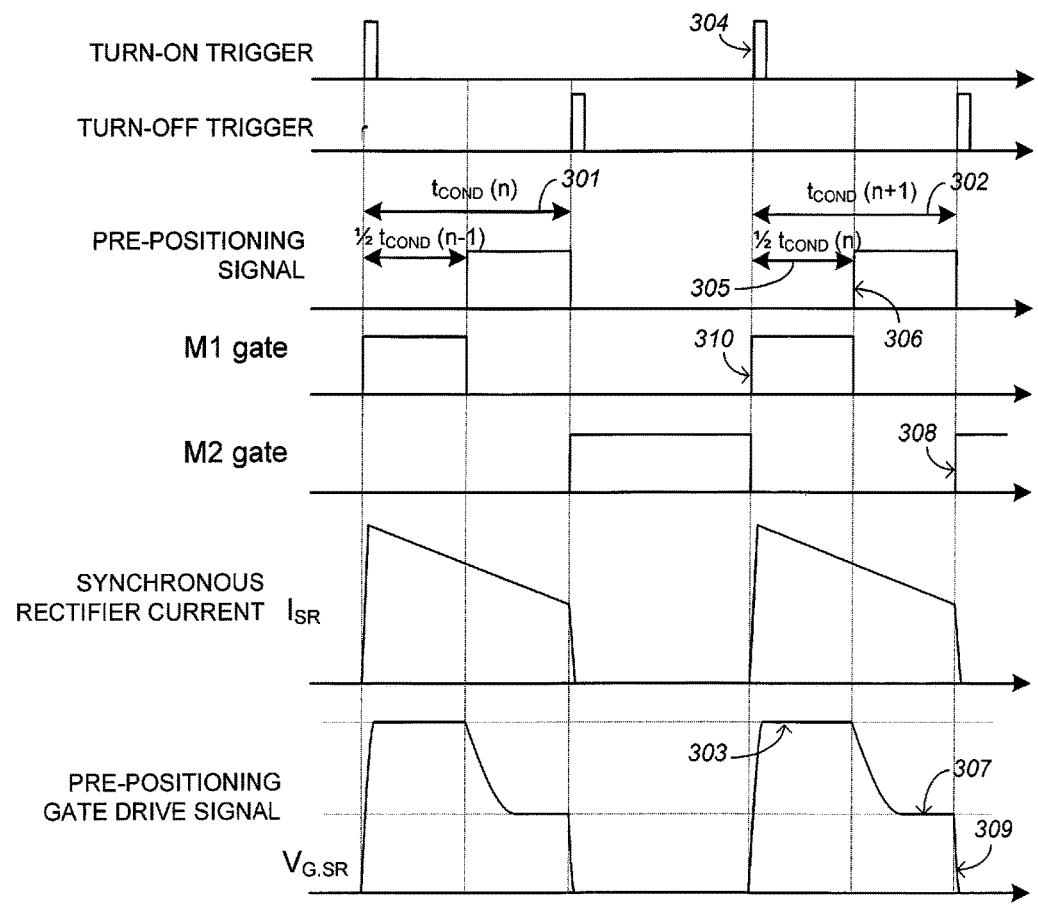
FIG. 11 shows waveforms of signals of a synchronous rectifier driver in accordance with an embodiment of the present invention.

FIG. 11 shows waveforms of signals of the SR driver 200 in accordance with an embodiment of the present invention. FIG. 11 shows, from top to bottom, waveforms of the turn-on trigger signal, the turn-off trigger signal, the pre-positioning signal (see FIGS. 8 and 10, TURN_OFF_ALLOW), the gate voltage of the high-side switch M1, the gate voltage of the low-side switch M2, the synchronous rectifier current ISR through the synchronous rectifier QSR, and the pre-positioning gate drive signal to the gate of the synchronous rectifier QSR. FIG. 11 shows a first switching cycle n and a second switching cycle n+1 of the synchronous rectifier QSR. The synchronous rectifier QSR has a conduction time of TCOND(n) in the first switching cycle (see 301) and a conduction time of TCOND(n+1) in the second switching cycle (see 302). In the second switching cycle, the high-side switch M1 is driven (see 310) to raise the gate voltage of the synchronous rectifier QSR to a first level (see 303) in response to the rising edge of turn-on trigger signal (see 304) to turn ON the synchronous rectifier QSR. After a time period that is 50% of the synchronous rectifier conduction time in the first switching cycle (½ TCOND(n); see 305), which is indicated by the rising edge of the pre-positioning signal in the second switching cycle (see 306), the gate of the synchronous rectifier QSR is pre-positioned by lowering the gate voltage of the synchronous rectifier QSR to a second level (see 307). The second level is lower than the first level but remains sufficient to maintain the synchronous rectifier QSR ON. The gate voltage of the synchronous rectifier QSR is maintained at the second level for another period of time. The low-side switch M2 is driven (see 308) to lower the gate voltage of the synchronous rectifier QSR from the second, pre-positioning level to rapidly turn OFF the synchronous rectifier QSR (see 309).

Circuits and methods for pre-positioning a gate of a synchronous rectifier for fast turn-off have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A synchronous rectifier driver comprising:
   a first node for connecting to a drain of a synchronous rectifier, a second node for connecting to a source of the synchronous rectifier, and a third node for connecting to a gate of the synchronous rectifier; and
   a gate drive circuit that is configured to increase a gate drive signal to the gate of the synchronous rectifier to a first level to turn ON the synchronous rectifier, to reduce the gate drive signal from the first level to a second level after a first time period that is based on a detected conduction time period of the synchronous rectifier, to maintain the gate drive signal at the second level for a second time period before receiving an indication to turn OFF the synchronous rectifier, and to turn OFF the synchronous rectifier by reducing the gate drive signal from the second level to a third level in response to receiving the indication to turn OFF the synchronous rectifier.

2. The synchronous rectifier driver of claim 1, wherein the first time period is 50% of the detected conduction time period of the synchronous rectifier.

3. The synchronous rectifier driver of claim 1, wherein the gate drive circuit comprises:
   a first switch having a drain that is connected to the gate of the synchronous rectifier; and
   a current source that generates a bias current to the gate of the synchronous rectifier to maintain the second level at the gate of the synchronous rectifier.

4. The synchronous rectifier driver of claim 3, wherein the gate drive circuit further comprises:
   a second switch having a drain that is connected to the gate of the synchronous rectifier, the second switch being configured to reduce the gate drive signal from the second level to the third level to turn OFF the synchronous rectifier; and
   a third switch having a source that is connected to the gate of the synchronous rectifier, the third switch being configured to increase the gate drive signal to the first level to turn ON the synchronous rectifier.

5. The synchronous rectifier driver of claim 1, wherein the synchronous rectifier driver is in an integrated circuit (IC) package and the first, second, and third nodes of the synchronous rectifier driver are pins of the IC package.

6. The synchronous rectifier driver of claim 1, wherein the synchronous rectifier is connected to a secondary winding of a transformer of a switching converter circuit.

7. The synchronous rectifier driver of claim 6, wherein the switching converter circuit is a flyback converter.

8. A method of controlling conduction of a synchronous rectifier, the method comprising:
   detecting a conduction time period of a synchronous rectifier in a first switching cycle;
   in a second switching cycle that occurs after the first switching cycle, driving a gate of the synchronous rectifier with a gate voltage at a first level to turn ON the synchronous rectifier;
   in the second switching cycle, in response to expiration of a period of time that is based on the detected conduction time period of the synchronous rectifier in the first switching cycle and before receiving an indication to turn OFF the synchronous rectifier, reducing the gate voltage to a second level that is lower than the first level, wherein the second level keeps the synchronous rectifier ON; and
   in the second switching cycle and in response to receiving the indication to turn OFF the synchronous rectifier, turning OFF the synchronous rectifier by further reducing the gate voltage from the second level.

9. The method of claim 8, wherein the period of time is adaptively set to be 50% of the detected conduction time period of the synchronous rectifier in the first switching cycle.

10. The method of claim 8, wherein detecting the conduction time period of the synchronous rectifier in the first switching cycle comprises:
   in the first switching cycle, charging a first capacitor during the conduction time period of the synchronous rectifier in the first switching cycle; and in the first switching cycle, storing in a second capacitor a peak of a charge of the first capacitor.

11. The method of claim 10, further comprising:
in the second switching cycle, setting the period of time to be based on a percentage of a charge stored in the second capacitor.

12. A switching converter circuit comprising:
a primary-side switch on a primary side of a transformer;
a synchronous rectifier on a secondary side of the transformer; and
a synchronous rectifier driver on the secondary side of the transformer, the synchronous rectifier driver comprising a first node connected to a drain of the synchronous rectifier, a second node connected to a gate of the synchronous rectifier, a third node connected to a source of the synchronous rectifier, and a pre-positioning gate driver that generates a gate drive signal to the gate of the synchronous rectifier, sets the gate drive signal to a first level to turn ON the synchronous rectifier for a first time period that is a percentage of a detected conduction time period of the synchronous rectifier, reduces the gate drive signal from the first level to a second level that keeps the synchronous rectifier ON after expiration of the first time period but before the synchronous rectifier is to be turned OFF, and reduces the gate drive signal from the second level to turn OFF the synchronous rectifier.

13. The switching converter circuit of claim 12, wherein the first time period is equal to 50 percent of the conduction time period of the synchronous rectifier.

14. The switching converter circuit of claim 12, wherein the first, second, and third nodes of the synchronous rectifier driver are pins of an integrated circuit (IC) package of the synchronous rectifier driver.

15. The switching converter circuit of claim 12, wherein the pre-positioning gate driver comprises:
a first switch having a drain that is connected to the gate of the synchronous rectifier; and
a current source that generates a bias current to the gate of the synchronous rectifier to maintain the second level at the gate of the synchronous rectifier.

16. The switching converter circuit of claim 15, wherein the pre-positioning gate driver further comprises:
a second switch having a drain that is connected to the gate of the synchronous rectifier, the second switch being configured to reduce the gate drive signal from the second level to turn OFF the synchronous rectifier; and
a third switch having a source that is connected to the gate of the synchronous rectifier, the third switch being configured to increase the gate drive signal to the first level to turn ON the synchronous rectifier.

17. The switching converter circuit of claim 12, wherein the switching converter circuit comprises a flyback converter.

18. The switching converter circuit of claim 12, wherein the synchronous rectifier driver further comprises:
a first capacitor that is charged during the conduction time period of the synchronous rectifier in a first switching cycle; and
a second capacitor that stores a peak of a charge in the first capacitor in the first switching cycle.

19. The switching converter circuit of claim 18, wherein the gate drive signal is reduced from the first level to the second level in a second switching cycle that follows the first switching cycle after a time period that is based on a charge stored in the second capacitor.

* * * * *